March 16, 1926. 1,577,072
F. PARDEE
FEEDER FOR BREAKERS
Filed March 21, 1924  3 Sheets-Sheet 1

INVENTOR
FRANK PARDEE.
BY D. Anthony Usina
ATTORNEY

March 16, 1926. 1,577,072
F. PARDEE
FEEDER FOR BREAKERS
Filed March 21, 1924 3 Sheets-Sheet 2
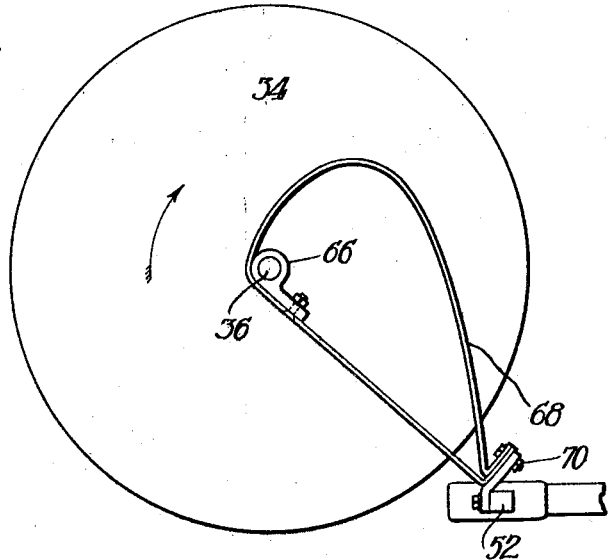
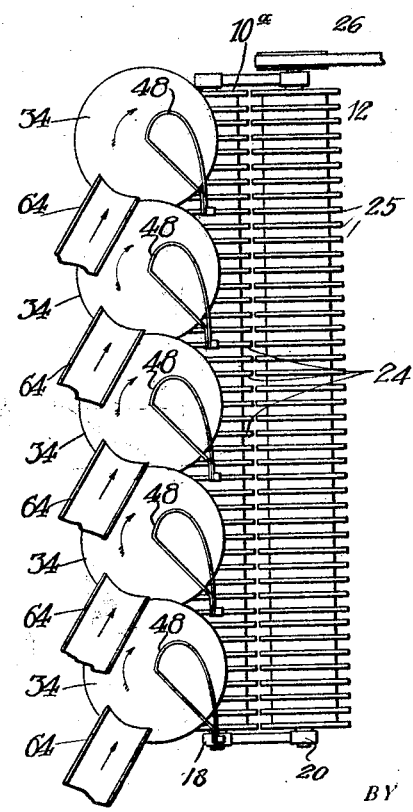
INVENTOR
FRANK PARDEE
BY
ATTORNEY March 16, 1926.
1,577,072
F. PARDEE
FEEDER FOR BREAKERS
Filed March 21, 1924    3 Sheets-Sheet 3
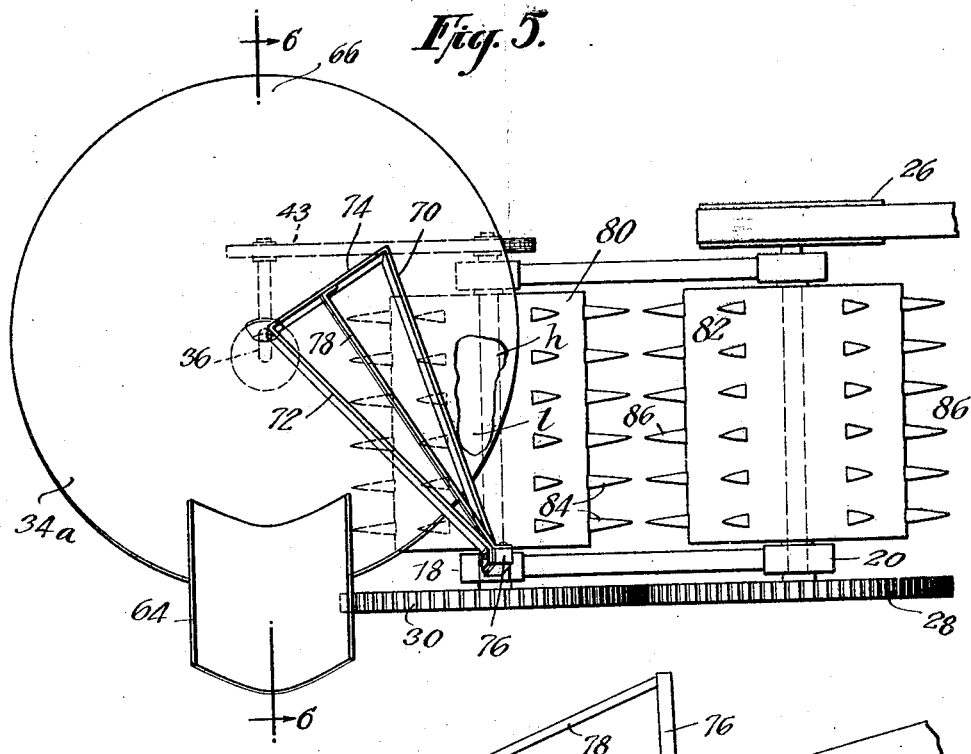
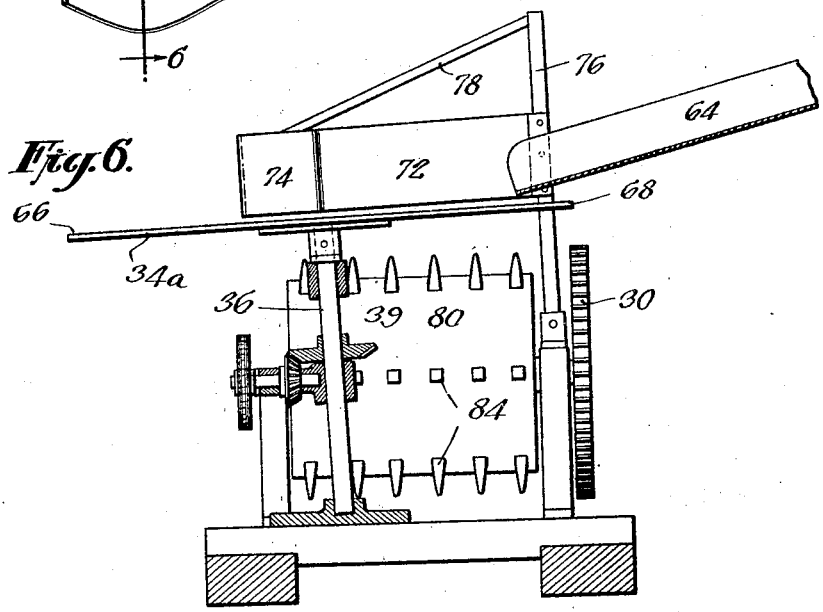
INVENTOR
FRANK PARDEE.
BY
ATTORNEY Patented Mar. 16, 1926.

1,577,072

UNITED STATES PATENT OFFICE.

FRANK PARDEE, OF HAZLETON, PENNSYLVANIA.

FEEDER FOR BREAKERS.

Application filed March 21, 1924. Serial No. 700,749.

*To all whom it may concern:*

Be it known that I, FRANK PARDEE, a citizen of the United States, and a resident of Hazleton, in the county of Luzerne and State of Pennsylvania, have invented certain new and useful Improvements in Feeders for Breakers, of which the following is a specification.

This invention relates to means for feeding lumps of material to a breaker so that the lumps are discharged with their greatest length extending in such direction that they will be acted upon in the most effective manner by the breaker  The invention is particularly useful for feeding lumps of coal to a coal breaker in such a manner that the longest axes of the lumps extend substantially in the same direction as the axes of the breaker rolls.

An embodiment of the invention is illustrated in the accompanying drawings in which—

Fig. 3 is a detail of a modification;

Fig. 4 is a diagrammatic plan illustrating a plurality of feeders for discharging lumps throughout practically the entire length of one of the breaker rolls;

Figs. 5 and 6 illustrate modifications, Fig. 6 being a section on line 6—6 of Fig. 5.

Figure 1:
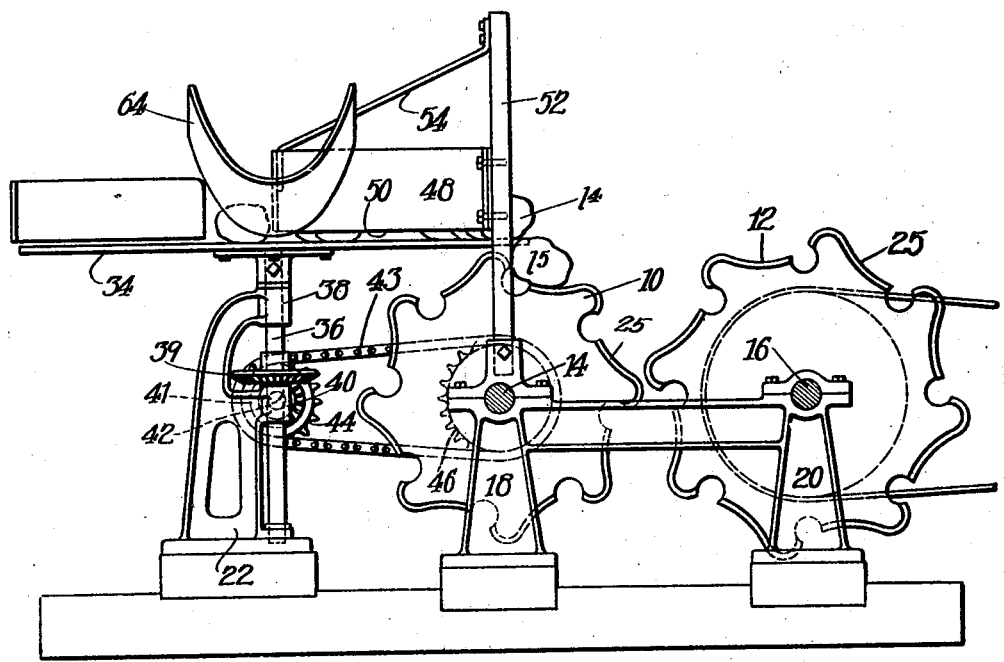
Fig. 1 is an elevation showing my improved feeder operatively connected with a coal breaker.

Referring in detail to the drawings, a pair of breaker rolls 10 and 12 are mounted on shafts 14 and 16 supported in suitable bearings 18 and 20 secured to supporting timbers 22. The breaker rolls illustrated in Figs. 1 to 3 each comprise a series of opposed toothed discs 24 and 25. However, it is to be understood that my improved feeder may be used in connection with various types of breakers. The breaker rolls are driven by a pulley 26 from a suitable source of power, the two rolls being operatively connected by means of gears 28 and 30 shown in plan in Fig. 2.

Mounted in juxtaposition to the breaker is my improved feeder which is indicated as a whole by a numeral 32. This feeder includes a rotary disc 34 secured to a substantially vertical shaft 36 carried in bearings 38 and 40 and adapted to be rotated by any suitable driving mechanism. By way of example, in the drawings I have shown the shaft 36 provided with a bevel gear 39 meshing with a similar gear 41 carried on a shaft 42 which is driven by a chain 43 and sprockets 44 and 46 from the shaft 14 of the breaker roll 10.

Mounted above the disc 34 is a blade 48 whose lower edge 50 clears the top surface of the rotating disc 34. The blade is secured at one end to a suitable upright 52 and the other end is connected to a supporting member 54 which in turn is secured at its upper end to the post 52. The supporting structure for the blade, of course, may be varied, it merely being necessary to provide a structure which will permit the disc to rotate clear of the bottom edge of the blade 48.

Figure 2:
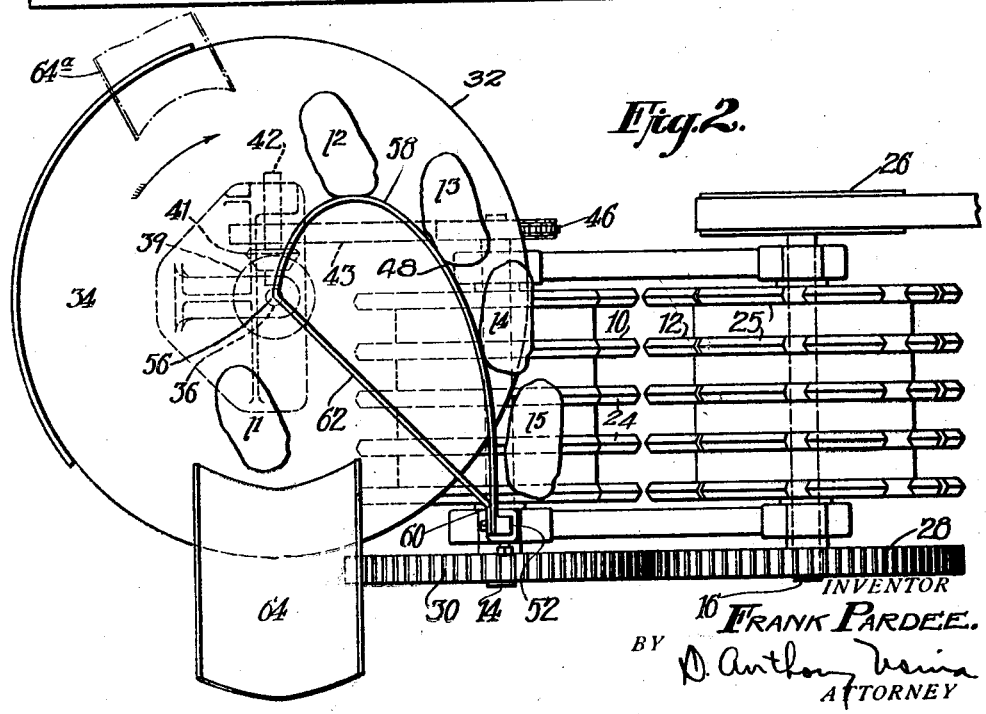
Fig. 2 is a top plan view.

As shown in Fig. 2 the blade is curved from the point 56 near the center of the disc 34 and outwardly as at 58 and terminates at 60 at a point beyond the periphery of the feeder disc. Part of the blade between the points 56 and 60 is a substantially straight wall as shown at 62.

The lumps of coal to be acted on by the breaker are fed preferably in single file, from an inclined shaking chute 64 carried by any suitable supports such as overhead suspension rods not shown. As each lump is discharged to the disc 34 it is carried around in a substantially circular path and finally is brought into contact with the curved orienting blade 48 so that said lumps are discharged from the feed disc 34 to the rolls of the breaker with the greatest length of the lumps extending substantially in the direction of the axes of the breaker rolls.

In Fig. 2 this action is illustrated by the lump which is shown in five different positions $1^1$ showing its position as discharged from the chute 64. $1^2$ represents the approximate position of the lump after it has been carried around by the disc 34 first striking the blade 48. Positions $1^3$ and $1^4$ show the result of the coaction between the rotary disc and fixed blade whereby the lump is oriented and $1^5$ shows the lump discharged with its greatest length extending in the direction of the axis of the breaker roll 10.

The curvature of the orienting blade 48 may be changed to correspond with the class of material being handled and also with the speed at which the disc 34 is rotated.

In some cases the blade may be mounted for angular adjustment either by swinging it from a point concentric with the rotating axes of the disc 34 or by pivoting the blade on the supporting post 52.

Fig. 3 shows the orienting blade provided at one end with a bearing 66 which is adapted to loosely engage an extended end of the shaft 36 extending above the top surface of the disc 34. When this arrangement is used the blade will be provided with an arcuate portion as indicated at 68 whereby it may be clamped in position by a bolt 70 to a suitable bracket carried by the post 52.

The position at which the chute 64 discharges the lumps to the disc 34 may be varied. For example it may be either in the position shown in full lines in Fig. 2 so that the lumps are carried some distance before they strike the orienting blade or the chute 64 may be located at the position indicated by the dotted lines 64$^a$ in which case the lumps will be carried a very short distance due to the rotary action of the disc before they strike the orienting blade.

In Fig. 4 I have shown diagrammatically a plan view of the coal breaker and a plurality of feeder discs 34 and orienting blades 48 which are adapted to feed the lumps delivered by the chutes 64 to different points along the long breaker roll 10$^a$.

With such an arrangement a great number of lumps may be delivered to the breaker rolls at the same time in such a way that the greatest axis of each lump extends in the direction of the length of the axes of rotation of the breaker rolls.

In Figs. 5 and 6 I have shown a slightly modified form of the invention. In these figures the feeder disc 34$^a$ is so mounted that its surface is in a plane inclined to the horizontal, the supporting shaft 36 being inclined to the vertical as shown in Fig. 6. The axis of the shaft 36 preferably lies in a plane substantially parallel with the plane of the axis of the breaker rolls. The axes of the shaft 36 and the shaft of the breaker rolls, however, are at an angle to one another. That is to say, the axis of the breaker roll is substantially horizontal while the axis of the shaft 36 is slightly inclined from the vertical. This inclination of the shaft 36 supports the disc 34$^a$ in a tilted position so that the low side of the disc is located about diametrically opposite the chute 64 as indicated at point 66, and the high side 68 is therefore located below the chute. As thus arranged it is clear that the lumps of coal discharged from the chute will be carried downward until they reach the low point 66 and that further rotation of the disc will carry the lumps upward. This inclined disc may be used either with the curved orienting blade as shown in the previous figures or may be used in connection with a straight orienting blade as shown in Fig. 5. One of the objects of inclining the disc is to insure that long lumps which are heavier at one end than the other, will fall from the disc in the substantially horizontal position. That is to say, they will fall flatwise instead of endwise. The theory is that in traveling up the incline the heavy end, for example $h$, of a lump will lag behind the light end $l$ hence the light end will project from the outer edge of the disc 36 before the heavy end does so. And as the disc rotates the lump will be rolled off sidewise and will fall in the substantially horizontal position. It is clear that when so discharged the light end falling first, there is less tendency for the lump to fall endwise or head first than would be the case if the heavy end had the earlier start in leaving the surface of the disc.

In Figs. 5 and 6 I have shown the orienting blade formed of straight flat plates 70 and 72 joined to an end piece 74 and supported by a suitable post 76 and truss-rod 78. In this figure I have also illustrated breaker rolls of another type which the feeder is adapted to work in conjunction with equally as well as with the breaker roll having cutting discs as described in connection with Figs. 1 to 4. The breaker rolls shown in Figs. 5 and 6 are of known construction and comprise substantially cylindrical members 80 and 82 having breaker teeth 84 and 86 which are adapted to break or split the long lumps discharged by the feeder into a number of smaller sizes of substantially cubical fracture.

In the foregoing description I have emphasized the fact that the lumps are discharged to the breaker with their greatest length extending in the direction of the axes of the breaker. It is desirable to discharge the lumps or individual pieces of coal or the like so that they will be carried down into the longitudinal bite between the opposed breaker rolls in such a way that a number of cutter discs or teeth on a roll will act on each lump thus breaking the same into a maximum number of substantially cubical pieces of a desired size with a minimum production of fines or waste pieces of unsaleable size.

From a commercial standpoint coal of a cubical fracture, that is coal of substantially spherical, polygonal or cubical shape, as distinguished from pieces or lumps which are thin and flat, has a higher sale value and is of better appearance. It is also true that cubical lumps of coal burn better in a furnace than thin flat pieces because the former will not pack as tightly as the latter and hence the combustion air and gas can readily permeate the fuel bed. On the other hand a mass of coal comprising thin flat pieces has a tendency to pack closely and choke the fuel bed which results in poor and incomplete combustion resulting in an ash or residue containing much unconsumed or waste fuel.

My improved feeder herein described provides means whereby the long lumps of coal can be discharged to the breaker in such position that the latter will reduce such lumps to a plurality of pieces of substantially cubical form. The feeder in combination with the breaker, therefore, provide means whereby coal is reduced to commercial sizes having a greater sale value than the coal which is fed and broken in a haphazard manner in breakers formerly constructed. It is also apparent that the invention provides means whereby the coal is broken to shapes which permit it to burn more readily and completely than coal which is fed and broken by apparatus heretofore used.

Though I have described with great particularity of detail certain embodiments of the invention it is not to be construed that I am limited thereto as various changes may be made by those skilled in the art without departing from the invention as defined in the appended claims.

What I claim is:—

1. A feeder for discharging lumps with their greatest lengths extending in a determined direction comprising a member rotatably mounted on a substantially or approximately vertical axis and a deflector blade adapted to orient each lump as it is carried around by said member.

2. A feeder for discharging lumps comprising a rotary disc and a fixed curved blade mounted above said disc adapted to orient the lumps carried thereby so that each lump will fall broadside off said disc.

3. A feeder for discharging lumps with their greatest lengths extending in a determined direction comprising a rotary disc and a blade mounted above the same which is so shaped that as each lump is carried around by the disc it is oriented and discharged with its greatest length extending in a predetermined direction.

4. A feeder for discharging lumps with their greatest lengths extending in a determined direction comprising a chute adapted to convey lumps in single file and discharge them one at a time, a rotary disc arranged to receive the lumps from said chute and a curved blade arranged to orient said lumps as they are carried around by said disc so that each lump is discharged with its greatest length extending in the direction of a line tangent to the point at which said lump leaves the disc.

5. A feeder for discharging lumps comprising a rotary member and a fixed member mounted above said rotary member adapted to orient the lumps carried thereby so that each lump will fall broadside off said rotary member as the latter turns.

6. A feeder for discharging lumps to a breaker with their greatest length extending in a determined direction, comprising a substantially or approximately horizontal disc, means for feeding the lumps to said disc and a blade adapted to deflect and discharge the lumps as they are carried around by said disc.

In witness whereof, I have hereunto signed my name.

FRANK PARDEE.